United States Patent [19]
Yamasaki et al.

[11] Patent Number: 5,341,262
[45] Date of Patent: Aug. 23, 1994

[54] MAGNETIC DATA STORAGE AND RETRIEVAL SYSTEM WITH PROVISION FOR PREVENTING CONDENSATION

[75] Inventors: Hidenori Yamasaki; Katsuaki Matsumoto; Yoshiharu Osuga, all of Hyogo, Japan

[73] Assignee: Mitsubishi Denki Kabushiki Kaisha, Tokyo, Japan

[21] Appl. No.: 957,065

[22] Filed: Oct. 6, 1992

Related U.S. Application Data

[63] Continuation of Ser. No. 758,727, Sep. 9, 1991, abandoned, which is a continuation of Ser. No. 283,835, Dec. 13, 1988, abandoned.

[30] Foreign Application Priority Data

Dec. 14, 1987 [JP]  Japan ................... 62-317832

[51] Int. Cl.⁵ .............................................. G11B 5/10
[52] U.S. Cl. .................................................. 360/128
[58] Field of Search ................ 360/137, 128, 130.22, 360/130.23, 130.24

[56] References Cited

U.S. PATENT DOCUMENTS 3,860,959  1/1975  Kudou ................ 360/130.24

FOREIGN PATENT DOCUMENTS 1959327 12/1970 Fed. Rep. of Germany .
0128038  7/1983 Japan ..................... 360/130.24
62-39444 10/1987 Japan .
1507568  4/1978 United Kingdom .

OTHER PUBLICATIONS

Patent Abstracts of Japan, vol. 12, No. 199, Jun. 9, 1988., Ozawa.
Patent Abstracts of Japan, vol. 9, No. 58, Mar. 14, 1985., Yanagihara.
Patent Abstracts of Japan, vol. 7, No. 241, Oct. 26, 1983., Tsubota.
Patent Abstracts of Japan, vol. 7, No. 290, Dec. 24, 1983., Yamashita.
Patent Abstracts of Japan, vol. 7, No. 168, Jul. 23, 1983., Takayama.

Primary Examiner—Andrew L. Sneizek
Attorney, Agent, or Firm—Burns, Doane, Swecker & Mathis

[57] ABSTRACT

An arrangement for preventing a condensation on a head for writing information into a storage medium and for reading the information from the storage medium. The arrangement includes a temperature detector for detecting the temperature of the head and a condensation detector for detecting condensation on the head, the temperature detector and the condensation detector being provided in the vicinity of the head, and a heater for heating the head. A controller causes the heater to be energized on the basis of the outputs from the temperature detector and the condensation detector if the head is below a predetermined temperature or if condensation exists on the head at temperatures above the said predetermined temperature.

3 Claims, 7 Drawing Sheets

MAGNETIC DATA STORAGE AND RETRIEVAL SYSTEM WITH PROVISION FOR PREVENTING CONDENSATION

This application is a continuation, divisional of application Ser. No. 07/758,727, filed Sep. 9, 1991, which is a continuation of application Ser. No. 07/283,835, field Dec. 13, 1988 both abandoned.

BACKGROUND OF THE INVENTION

1. Field of the Invention

The present invention relates to a condensation preventing-apparatus for preventing a magnetic tape from sticking to a rotary drum due to condensation on the drum surface, which is caused by environmental change within storing or reproducing apparatus such as a rotary head type PCM magnetic storage and reproduction apparatus.

2. Description of Prior Art

A prior art rotary type PCM magnetic storage and reproduction (referred to R-DAT hereafter) such as video tape recorders (referred to as VTR), is an apparatus in which a signal is stored into and reproduced from a magnetic tape that is wrapped at an angle around a rotary drum on which a magnetic head is mounted.

With such prior art apparatus, water condensation is caused by environmental change such as the surface temperature of the rotary drum reaching the condensation point of the atmosphere, and therefore the magnetic tape sticks to the surface of the rotary drum causing soiling of the rotary drum and the head as well as damage to the magnetic tape.

Also, with a non-contact type apparatus using a disk, correct detection of a signal is impaired by the condensation on the head of a pickup.

FIG. 4 shows a prior art apparatus for overcoming the problem of water condensation. In FIG. 4, a condensation sensor 5 is mounted on a holder 12 in the vicinity of a fixed drum 1b.. When the condensation sensor 5 detects condensation, a drum-drying heater 9 on the fixed drum 1b is operated to dry up a rotary drum 1a and the fixed drum 1b. When the condensation sensor 5 detects vaporization of the condensed water, the drum drying heater 9 is stopped and then the magnetic tape (not shown) is loaded on t he rotary drum for storage and reproduction operation.

FIG. 5 is a block diagram for showing a prior art apparatus for preventing condensation in the R-DAT shown in FIG. 4. When electrical resistance of the condensation sensor 5 varies due to condensation a condensation detection circuit 6 outputs a condensation signal to a microcomputer 11. In turn, the microcomputer 11 actuates a heater drive circuit 10 to supply electric power to the drum drying heater 9. In this manner, the heat generated by the heater is conducted to rotary drum 1a through the fixed drum 1b, thereby heating up entire drum to dry the surface thereof.

In the meantime, the microcomputer 11 sends an operation command to a rotary drum drive circuit 4 and a tape loading mechanism drive circuit 3. These commands become ready as soon as the microcomputer is supplied with a signal from the condensation detecting circuit 6 indicating that the drum has been dried up. The tape loading mechanism 2 includes a guide pin for wrapping the magnetic tape around the drum and other mechanical parts (both not shown).

The shape and position of the holder for holding the condensation sensor 5 is selected for the sensor to effectively detect the drying condition and condensation condition of the rotary drum and the fixed drum.

FIG. 6 shows a flowchart for illustrating the operation of the microcomputer 11 used in the aforementioned prior art apparatus for preventing condensation. The apparatus is in a standby state at step S21 where the apparatus is switched on but has not been in the storing or reproducing state yet. When the condensation sensor 5 and the condensation detecting circuit 6 detect condensation at step S22, the heater drive circuit 10 is actuated to energize the drum-drying heater 9 at step 23.

Then microcomputer again makes a decision based on whether or not condensation has occurred at step S24. If condensation no longer exists, then the microcomputer proceeds to step S25 to shut off the drum-drying heater 9. The microcomputer permits the magnetic tape to wrap around the drum, i.e., tape loading operation at step S26, and then completes the series of the steps at S27. If the drum is not in a condensation condition and therefore no condensation signal is output at S22, then the microcomputer proceeds to step S26. If the drum is in a condensation condition at step S24, then the microcomputer returns to step S23 for causing the heater 9 to operate till the drum has dried up.

Condensation occurs frequently in automobiles in which environmental conditions can vary not only greatly but also frequently. Thus the above-mentioned prior art apparatus for preventing condensation condition, which operates only after condensation has occurred, cannot effectively reduce frequency of condensation.

SUMMARY OF THE INVENTION

The present invention was made to overcome the aforementioned drawbacks and is to provide a storing and reproducing apparatus in which the surface temperature of the drum is maintained above a predetermined value to reduce chance of condensation as well as the drum surface and the proximity of the head being dried up in a short time even if condensation occurs. An apparatus for preventing condensation in a storing and reproducing apparatus according to the present invention is provided with a head for storing information into or reproducing information from a storage medium, a temperature detecting means for detecting the temperature of the head and a condensation detecting means which are disposed in the vicinity of the head, a heater means for heating the head, and a control means for supplying the heating means with electric power to heat the head on the basis of the output from the temperature detecting means and the condensation detecting means or when condensation condition exists at temperatures higher than the predetermined temperature.

BRIEF DESCRIPTION OF THE DRAWINGS

Other objects and advantages of the invention will be more apparent from the following specification and the drawings in which:

FIG. 1 to FIG. 3 illustrate an embodiment of the present invention;

FIG. 1 is a block diagram showing a general arrangement of the embodiment;

FIG. 2 is a perspective view of the major portion of the invention;

FIG. 4 a perspective view of the major portion of the prior art;

is a FIG. 5 block diagram illustrating a general arrangement; and FIG. 6 flowchart of a microcomputer used in the prior art.

EMBODIMENT OF THE INVENTION

The present invention will now be described in detail with reference to the drawings.

Figure 1:
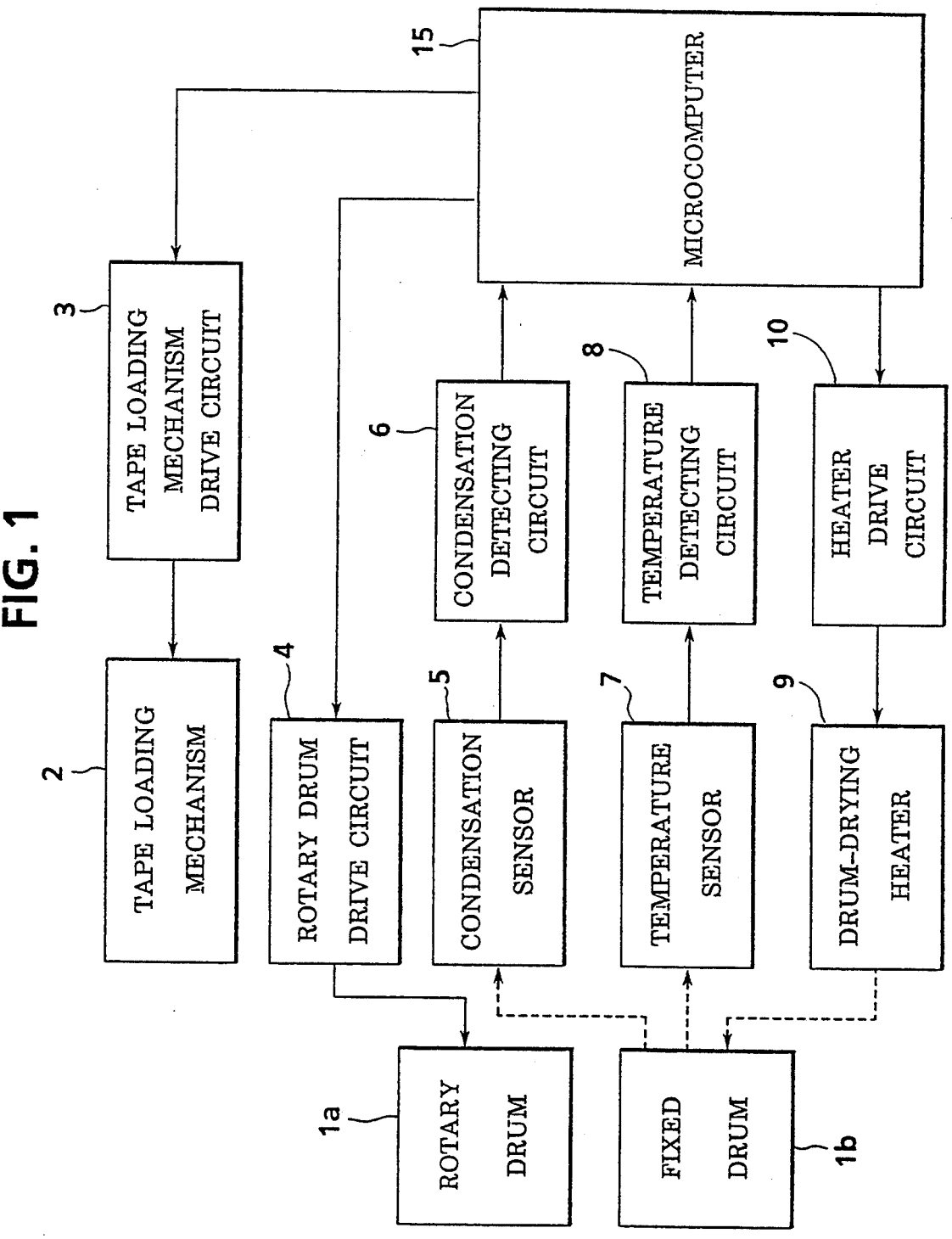
Figure 5:
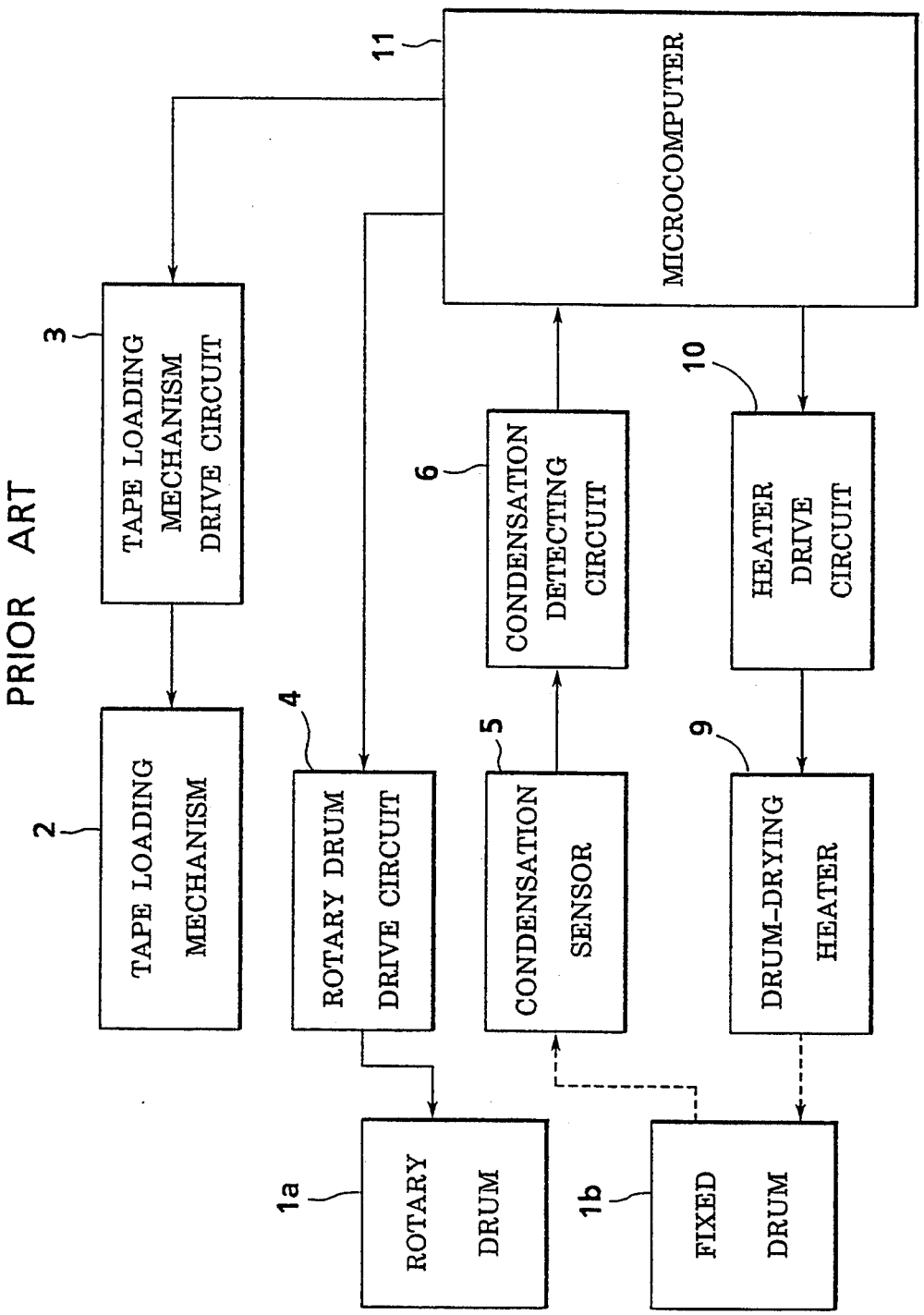
Figure 6:
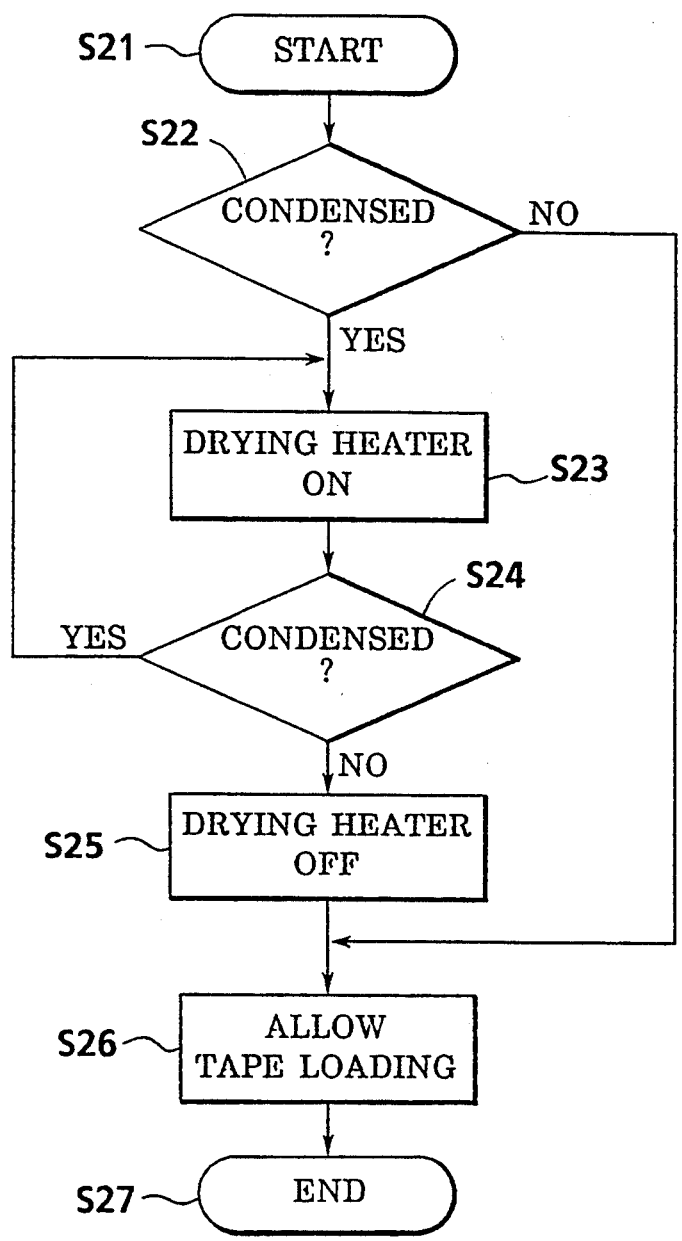

FIG. 1 is a block diagram for showing an apparatus for preventing condensation according to the present invention. The invention differs from the prior shown in FIG. 5 in that a temperature sensor 7 and temperature detecting circuit 8 are provided in the present invention. The temperature sensor 7 outputs a low temperature signal to a microcomputer 15 when the temperature is below a predetermined value. The microcomputer 15, in turn, actuates a heater drive circuit 10 to operate, initiating supplying of electric power to a drum drying-heater 9. Thus the heater 9 also serves to keep the surface of the drum 1a warm. Also, when the surface temperature of the drum has reached the predetermined value, the microcomputer 15 outputs a command, indicative of stoppage of supply of the electric power to the drum-drying-heater 9, to the heater drive circuit 10 on the basis of signals from the temperature sensor 7 and the temperature detecting circuit 8.

The operations of the condensation sensor 5, the condensation detection circuit 6, the tape loading mechanism 2, the tape loading mechanism drive circuit 3, the rotary drum drive circuit 4, and the rotary drum 1a are similar to those in the prior art.

Figure 2:
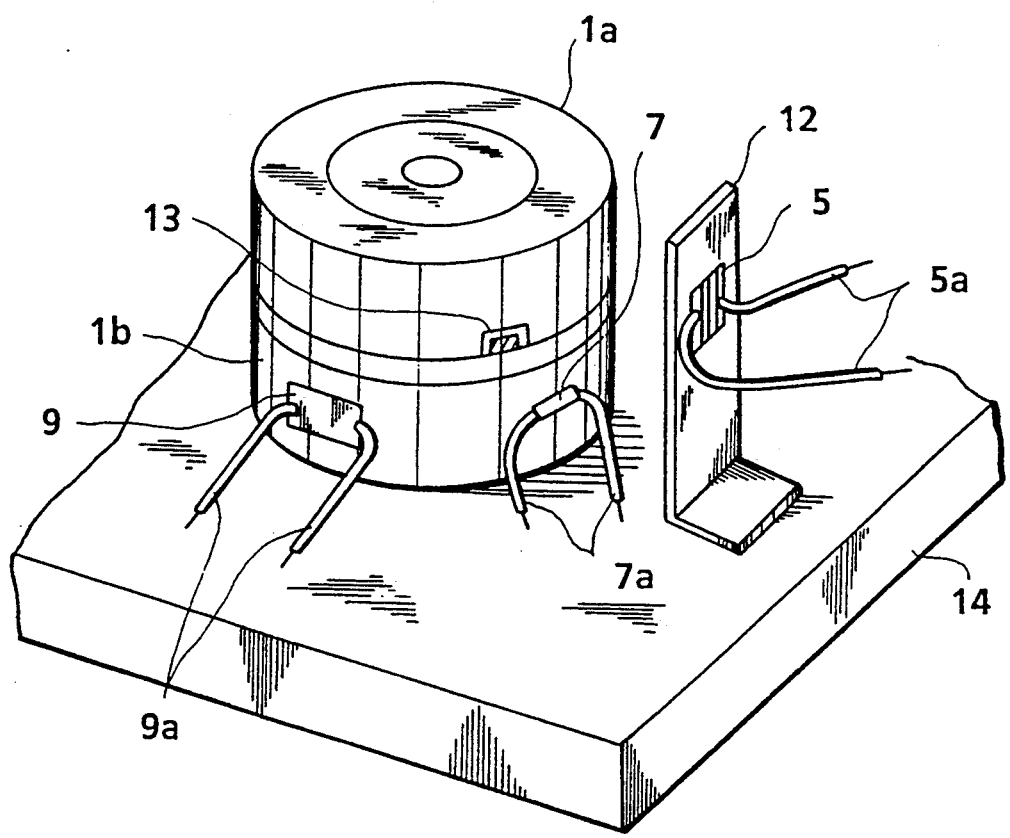

FIG. 2 shows a perspective view of the apparatus in FIG. 1. In FIG. 2, to the fixed drum 1b are attached the temperature sensor 7 having lead wires 7a and the drum drying-heater 9 having lead wires 9a on a portion remote from the side at which the tape is to be loaded. The condensation sensor 5 having lead wires 5a is attached to a holder 12 which is provided near the rotary drum 1a. A deck base 14 supports the holder 12, the fixed drum 1b, and the rotary drum 1a provided thereon. A magnetic head 13 is mounted on the rotary drum 1a.

Figure 3A:
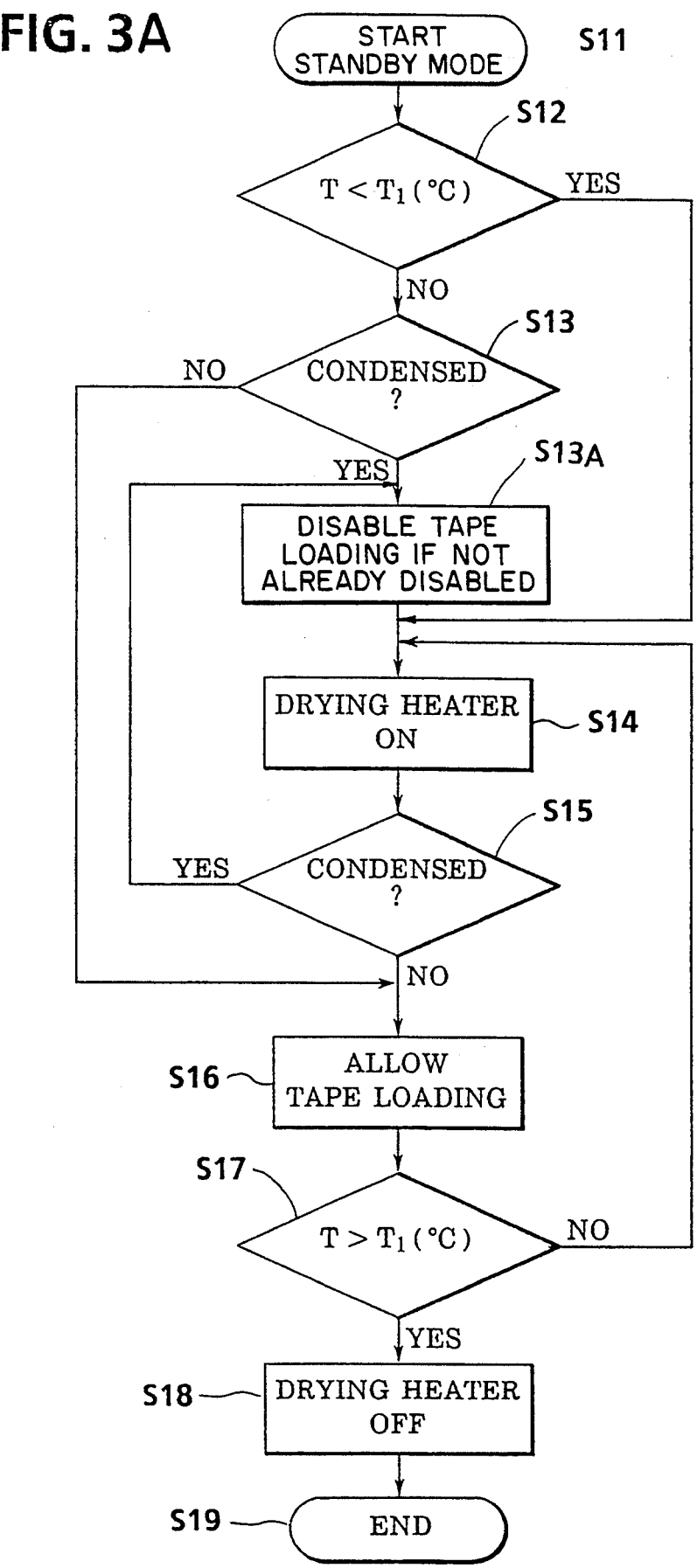
FIG. 3A is a flowchart depicting a preferred operation of the invention according to a first mode.
Figure 3B:
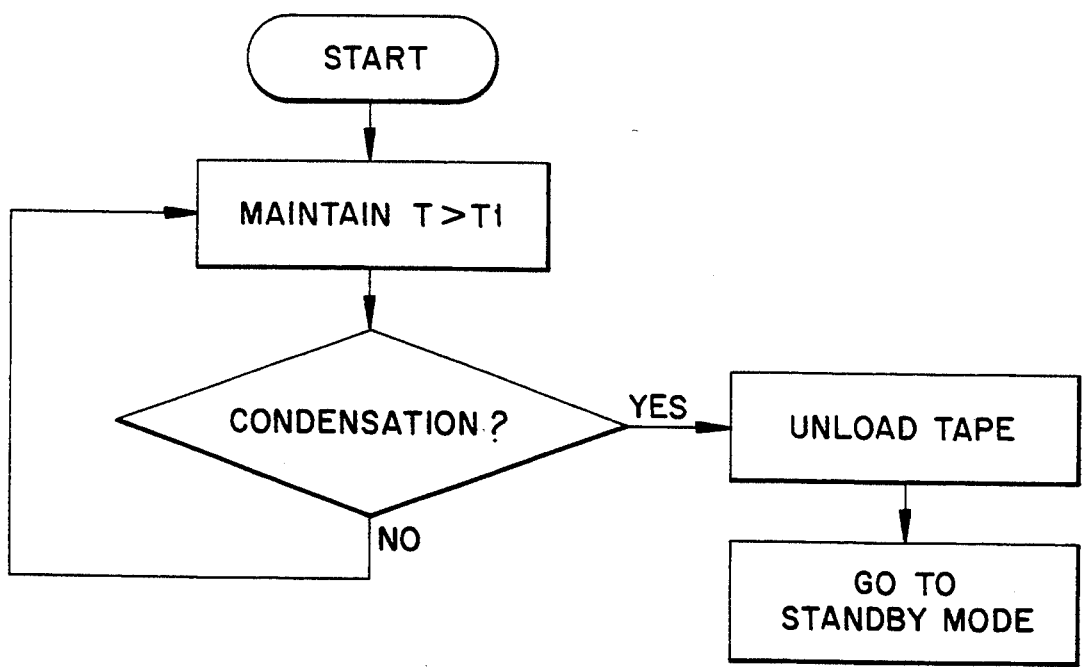
FIG. 3B is a flowchart depicting a preferred operation of the invention according to a second mode.
Figure 4:
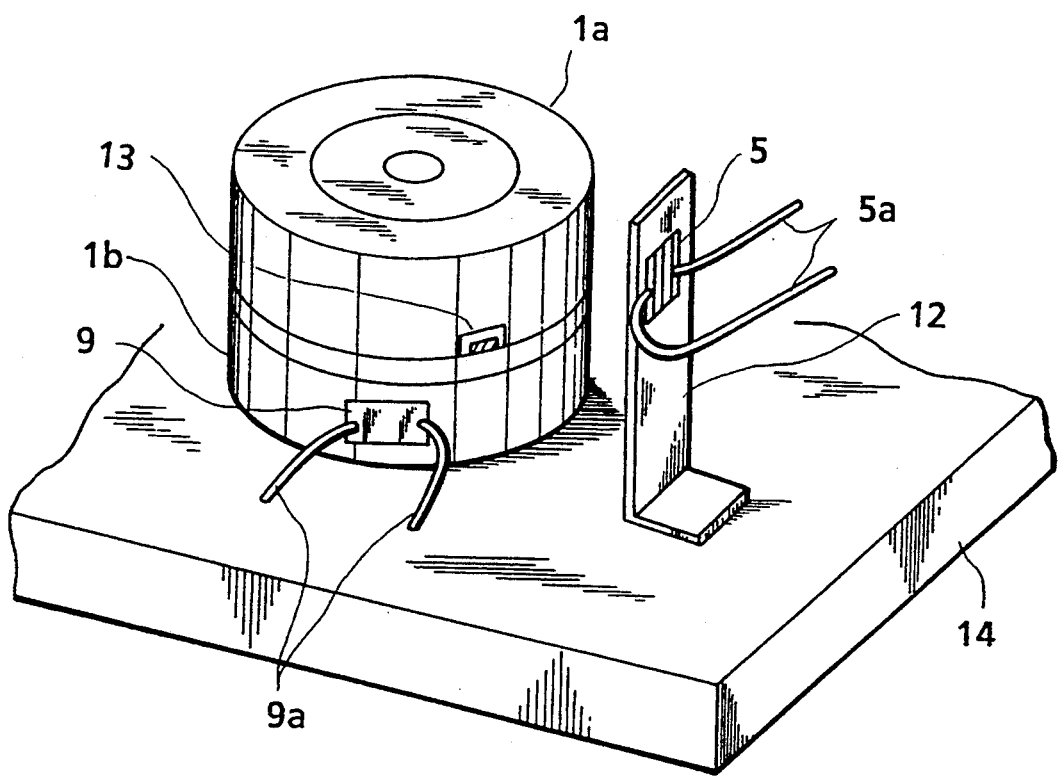
FIG. 4 to FIG. 6 illustrate a prior art apparatus.

The operation of the present invention will now be described with reference to a flowchart in FIG. 3. The apparatus is switched on at a start point S11 but has not been in storage or reproduction mode yet. When the sensor 7 detects that the surface temperature of the fixed drum 1b is below a predetermined threshold temperature T1 °C. at steps S12 and S17, the temperature detecting circuit 8 sends a low temperature signal to a microcomputer 15, and the drying-heater 9 is energized to heat the drum 1a and 1b at S14. If the temperature is above the predetermined temperature T1 °C., at step S12 a decision is made based on whether or not a condensation signal is present at S13. If the condensation signal is present at S13, then loading of the magnetic tape is disabled at step S13A and at step 14 the drying-heater 9 operates to dry up the drums 1a and 1b. Then, a decision is again made based on whether or not the condensation exists at step S15 and if the condensation exists, the drying-heater 9 is energized to continuously heat the drums at S14. If the condensation does not exist, i.e., the drums are in dry condition, then the microcomputer waits for a tape loading command which commands operation to wrap the magnetic tape around the rotary drum 1a at S16. Then at S17, if the temperature is above the predetermined temperature T1 °C., the supply of electric power to the heater 9 is stopped at step S18. If the temperature is below the predetermined temperature T1 °C. at step S17, then the procedure returns to step S14 to continue supply of electric energy to the drying-heater 9. The operation completes at the terminal point S19. In the meantime, if the condensation is not detected at step S13, then the procedure proceeds to S16 thereby allowing loading of the magnetic tape. Additionally, the condensation preventing apparatus is arranged in such a way that the tape loading mechanism 2 is driven to draw the magnetic tape from the head 13 thereby causing the magnetic storage and reproduction apparatus to return to a standby state thereof if condensation occurs while the magnetic storage and reproduction apparatus is in operation, as shown at step S15A. While the prior art apparatus permits the heater to operate only after the condensation has occurred, the embodiment mentioned above operates to warm up the head so that the temperature around the head is above the predetermined temperature T1 °C. Thus the effect is that occurrence of condensation is prevented. Also, even if the condensation occurs the temperature around the head is above the predetermined temperature T1 °C.; therefore the time required for heating and drying is shorter than the prior art, permitting quick return to the state in which tape loading is allowed. Condensation tends to occur when warm air flows suddenly into the vicinity of the magnetic storage and reproduction apparatus at low temperature, as when a heater system operates to cause a rapid rise in temperature in a car during winter time or when highly humid air invades, due to an open door, into an air conditioned car in a rainy season.

The drum temperature has not been specified in the aforementioned embodiment, but the threshold temperature at which the heater is caused to operate may be set to a temperature in the range of 0° to 30° C. Although the temperature sensor 7 is attached, as shown in FIG. 2, to the fixed drum 1b, it may also be mounted on an electric circuit board near the drum.

What is claimed is:

1. Apparatus comprising:

a drum;

loading means for loading a storage medium onto said drum and for unloading said storage medium from said drum;

a head for writing information on the storage medium and for reading the information from the storage medium when the storage medium is loaded on said drum;

temperature detecting means provided in the vicinity of said head for detecting the temperature of the drum;

condensation detecting means provided in the vicinity of said head for detecting condensation on the drum;

a radiant heater for heating said drum; and control means responsively connected to said temperature detecting means and said condensation detecting means and operatively connected to said loading means and said radiant heater for operating in a first mode prior to storage medium loading wherein said control means controls said radiant heater to heat without disabling said loading means from loading said storage medium when said temperature detecting means detects that the temperature of the drum is below a predetermined temperature and said condensation detecting means detects no condensation, and controls said radiant heater to heat and disables said loading means from loading said storage medium when said condensation detecting means detects condensation, and for operating in a second mode after storage medium loading wherein said control means controls said radiant heater to maintain said temperature of said drum above said predetermined temperature without causing said loading means to unload said storage medium when said condensation detecting means detects no condensation, and controls said loading means to unload said storage medium when said condensation detecting means detects condensation.

2. An apparatus according to claim 1, wherein said predetermined temperature is in a range from about 0° C. to about +30° C.

3. An apparatus according to claim 1 wherein said storage medium is a tape.

* * * * *